United States Patent [19]
Atita

[11] Patent Number: 5,472,795
[45] Date of Patent: Dec. 5, 1995

[54] MULTILAYER NANOLAMINATES CONTAINING POLYCRYSTALLINE ZIROCONIA

[75] Inventor: Carolyn R. Atita, Shorewood, Wis.

[73] Assignee: Board of Regents of The University of The University of Wisconsin System, on Behalf of The University of Wisconsin-Milwaukee, Milwaukee, Wis.

[21] Appl. No.: 266,236

[22] Filed: Jun. 27, 1994

[51] Int. Cl.$^6$ .................................................. B32B 9/00
[52] U.S. Cl. .................. 428/660; 428/610; 428/627; 428/632; 428/635; 428/698; 428/702
[58] Field of Search .............................. 428/688, 610, 428/660, 627, 632, 635, 698, 702

[56] References Cited

U.S. PATENT DOCUMENTS

| | | | |
|---|---|---|---|
| 4,350,729 | 9/1982 | Nakano et al. | 428/209 |
| 4,485,151 | 11/1984 | Stecura | 428/633 |
| 4,525,464 | 6/1985 | Claussen et al. | 501/103 |
| 4,532,190 | 7/1985 | Kanbe et al. | 428/627 |
| 4,535,033 | 8/1985 | Stecura | 428/633 |
| 4,724,169 | 2/1988 | Keem et al. | 427/249 |
| 4,904,542 | 2/1990 | Mroczkowski | 428/610 |
| 4,919,778 | 4/1990 | Dietrich et al. | 204/192.27 |
| 4,940,693 | 7/1990 | Shappirio et al. | 505/1 |
| 5,102,697 | 4/1992 | Grunke et al. | 427/229 |
| 5,108,846 | 4/1992 | Steininger | 428/694 |
| 5,192,410 | 3/1993 | Ito et al. | 204/192.16 |
| 5,279,722 | 1/1994 | Szczyrbowski et al. | 204/192.27 |

OTHER PUBLICATIONS

"Design of High–Toughness Laminar Zirconia Composites," pp. 969–974, *Ceramic Bulletin*, vol. 71, No. 6, 1992.
"New Scientific Approaches to Development of Tool Materials," pp. 151–165, *International Materials Reviews*, vol. 33, No. 3, 1988.
"Phase Mapping Sputter Deposited Wide Band–Gap Metal Oxides," Proc. Mater, Res. Soc. 242, 737–42, 1992.
"Near–Band Gap Optical Behavior of Sputter Deposited α– and α+β–ZrO$_2$ Films," pp. 2756–2758, J. Appl. Phys. 66 (6), 15 Sep. 1989.
"Wear–Induced Phase Transformation in Yttria Stabilized Zirconia: X–Ray Photoelectron Spectroscopic Studies," pp. 1438–1440, Appl. Phys. Lett. 60 (12), 23 Mar. 1992.
"Phase Maps for Sputter Deposited Refractory Metal Oxide Ceramic Coatings: Review of Niobium Oxide, Yttrium Oxide, and Zirconium Oxide Growth," 666 *Materials Science and Technology*, Aug. 1992, vol. 8.
"Characterization Studies of Transformation–Toughened Ceramics," pp. 955–960, *Ceramic Bulletin*, vol. 71, No. 6, 1992.
"Indirect Band Gap in α–ZrO$_2$," pp. 3345–3346, J. Vac. Sci. Technol. A8 (4), Jul./Aug. 1990.
"The Transition from αZr to αZrO$_2$ Growth in Sputter–Deposited Films as a Function of Gas O$_2$ Content, Rare–Gas Type, and Cathode Voltage," pp. 1235–1239, J. Vac. Sci. Technol. A 7 (3), May/Jun. 1989.
"Phase Formation in Sputter Deposited Metal (V, Nb, Zr, Y) Oxides: Relationship to Metal, Metal–Oxygen, and Oxygen Flux," pp. 1540–1547, J. Vac. Sci. Technol. A. 11 (4), Jul./Aug. 1993.

*Primary Examiner*—Patrick J. Ryan
*Assistant Examiner*—Kam F. Lee
*Attorney, Agent, or Firm*—Foley & Lardner

[57] ABSTRACT

Layers of zirconium oxide and another ceramic, such as alumina or silicon carbide, are sequentially deposited on a support to form a nanolaminate containing a thin layer of polycrystalline metastable tetragonal zirconia deposited on the support. A process for making a nanolaminate material of the invention is carried out by sputter deposition. Zirconia is deposited on the chosen support by vacuum sputter deposition under conditions effective to form a thin layer of polycrystalline, metastable tetragonal zirconia on the support. A hard ceramic such as alumina is then deposited on the support by vacuum sputter deposition under conditions effective to form a thin layer of hard ceramic superposed on the zirconia layer.

16 Claims, 3 Drawing Sheets

MULTILAYER NANOLAMINATES CONTAINING POLYCRYSTALLINE ZIROCONIA

This invention was made with government support under a research grant awarded by the U.S. Army Research Office. The government has certain rights in this invention.

TECHNICAL FIELD

This invention relates to thin films formed by sputter deposition, particularly to transparent ceramic nanolaminates formed by sputter deposition.

BACKGROUND OF THE INVENTION

Reactive sputter deposition is widely used for growing metal oxide coatings. Sputter deposition involves non-equilibrium layer growth at a solid-vapor interface. For a given metal-oxygen system, thermodynamics predicts the phases that should form in the absence of kinetic barriers to growth. Kinetics, however, control the material that is actually formed. For this reason, it is possible to grow high melting point oxides at low temperatures and metastable phases not attainable in a bulk material.

Protective coatings formed by sputter deposition are well known and have been used in a variety of applications. For example, Ito et al. U.S. Pat. No. 5,192,410 describes a laminate wherein a first layer may be a nitride or carbide of zirconium and a second layer made of a transparent ceramic such as aluminum oxide. Mroczkowski U.S. Pat. No. 4,904,542 describes alternating metallic and ceramic layers, wherein the metallic layer can be zirconium and the ceramic material can be a nitride, carbide or oxide of zirconium. In the multilayer structure of Dietrich et al. U.S. Pat. No. 4,919,778, zirconium oxide and aluminum oxide are mentioned as alternatives for the first and fifth layers. In each case, the characteristics and physical properties depend not only on the chemical composition of the successive layers, but also on the crystal structure and thickness of the layers.

The zirconia-alumina materials system model for a transformation-toughened ceramic is well known. See, *Science and Technology of Zirconia I, Advances in Ceramics*, Vol. 3 (edited by A. H. Heuer and L. W. Hobbs, American Ceramic Society, 1981) and *Science and Technology of Zirconia II, Advances in Ceramics*, Vol. 12 (edited by N. Claussen, M. Ruhle, and A. H. Heuer, American Ceramic Society, 1984). In a bulk composite, retained t-$ZrO_2$ particles are incorporated into an alumina matrix. The high temperature forming processes used to fabricate bulk composites preclude using other high elastic modulus ceramics for matrix materials in which an adverse reaction with zirconia occurs. An example of a potential matrix material is silicon carbide (SIC), with an elastic modulus of 400–440 GPa; see *Fabrication of Composites*, North-Holland, Amsterdam, 1983 p. 373. However, the high temperature required to densify SiC also results in undesirable zirconium silicate formation.

A laminate of alternating layers of alumina and a ceria-zirconia tetragonal polycrystalline $ZrO_2$ having thicknesses of around 10,000+ nanometers is described in Marshall, *Ceramic Bulletin*, Vol. 71, No. 6, 1992, pp. 969–973. While these and other composites such as magnesia-stabilized zirconia having reported toughnesses in the range of 10 to 20 MPa·m$^{1/2}$ are known, no comparable laminate containing substantially pure tetragonal polycrystalline zirconia has yet been developed. In particular, despite the availability of literature concerning transformation toughening of bulk zirconia composites fabricated at high temperatures, no method has been proposed for solving the problem of a high temperature reaction between the matrix and zirconia, or for providing a laminate of alumina and tetragonal zirconia. The present invention addresses these problems as described hereafter.

SUMMARY OF THE INVENTION

In accordance with the invention, layers of zirconium oxide and another ceramic, such as alumina or silicon carbide, are sequentially deposited on a substrate with no possibility for gross interlayer interaction. The present invention thereby provides a laminate product including a support, a thin layer of polycrystalline metastable tetragonal zirconia superposed on the support, and a thin layer of a hard ceramic other than zirconia superposed on the zirconia layer.

A process for making a nanolaminate material of the invention is carried out by sputter deposition. Zirconia is deposited on the chosen support by vacuum sputter deposition under conditions effective to form a thin layer of polycrystalline, metastable tetragonal zirconia on the support. A hard ceramic such as alumina is then deposited on the support by vacuum sputter deposition under conditions effective to form a thin layer of hard ceramic superposed on the zirconia layer.

Other objects, features and advantages of the invention will become apparent from the following detailed description. It should be understood, however, that the detailed description is given by way of illustration only, since various changes and modifications within the spirit and scope of the invention will become apparent to those skilled in the art from this detailed description.

BRIEF DESCRIPTION OF THE DRAWING

The invention will hereafter be described with reference to the accompanying drawing, wherein like numerals denote like elements, and.

DETAILED DESCRIPTION OF PREFERRED EMBODIMENTS

Figure 1:
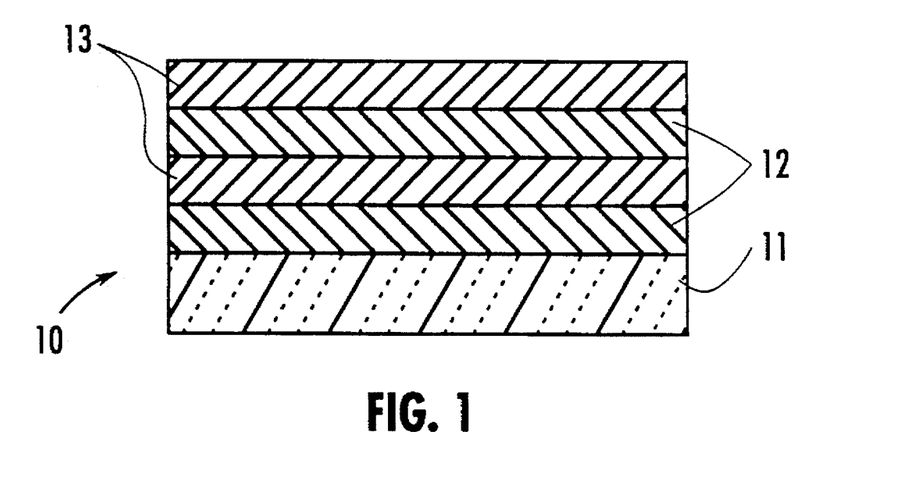
FIG. 1 is a cross-sectional view of a coated product according to the invention.

FIG. 1 illustrates a basic form of laminated product according to the invention. Such a product 10 includes a substrate or support 11, a thin layer 12 of polycrystalline, metastable tetragonal zirconia (t-$ZrO_2$) superposed on the support, and a thin layer 13 of a hard ceramic such as alumina ($Al_2O_3$) overlying the zirconia layer 12. Two or more layers 12, 13 are preferably alternately coated onto the support 10 to provide a stronger, thicker coating. Other hard ceramics for use in layer 13 include ceramic oxides, nitrides and carbides, particularly SiC, BN, TiN, $HfO_2$, and $ZrO_2$. Other possible hard ceramics, which may prove useful depending on the degree of elastic constraint required, include $B_4C$, AlB, TiC, $Be_2C$, ZrC, TaC, WC, and $ZrB_2$.

The zirconia layer 12 has the ability to revert to the more stable monoclinic crystal structure upon impact, thereby partially absorbing the energy of impact and acting as a shock absorber for the laminate. This in combination with the overlying thin layer of a hard ceramic such as alumina, creates a unique coating that is both hard and tough.

Figure 2:
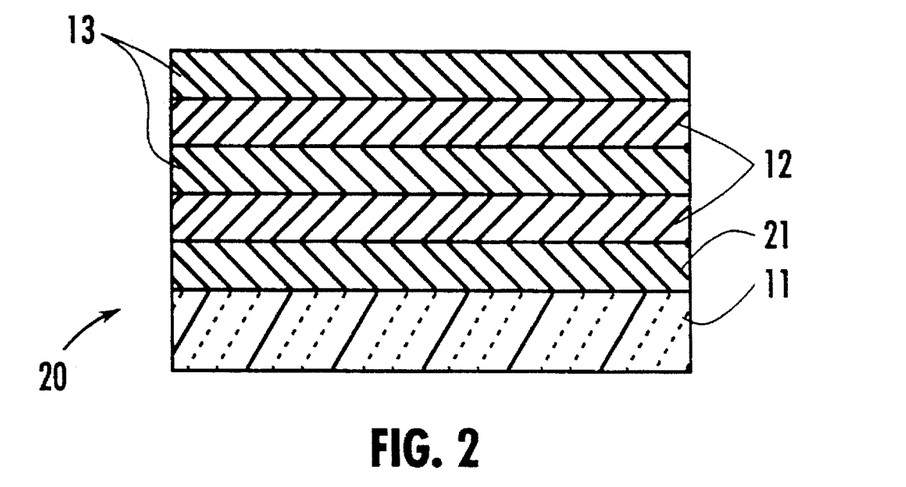
FIG. 2 is a cross-sectional view of a coated product according to the invention including a conductive layer.

The embodiment of FIG. 2 further includes a conductive indium-tin oxide (ITO) layer 21 which can be connected to electrodes in order to pass a current through the transparent product 20. Product 20 may be, for example, a heated window or the window of a touch screen or other display device. Layer 21 may, if desired, be relocated so that it is on top of the alternating layers 12, 13, instead of beneath layers 12, 13 as shown. However, locating the conductive layer 21 beneath the layers 21 protects it from damage and is thus preferred.

Support 11 may be made of virtually any desired material. Transparent supports such as glass or plastic can be used for applications such as windows, particular cellular telephone windows and other applications where a high hardness and toughness are required. A plastic support according to the invention is preferably selected from polyimide (e.g., Kapton), polyethylene, and polypropylene. Other useful supports include silicon of the type commonly used in sputter deposition. The thickness and other characteristics of the support depend on the desired application.

Figure 3A:
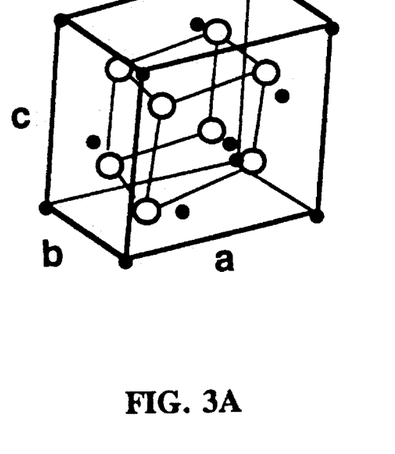
FIGS. 3A and 3B are schematic diagrams of monoclinic and tetragonal crystal polymorphs of zirconia, respectively, with open circles representing zirconium atoms and dark circles representing oxygen atoms.
Figure 3B:
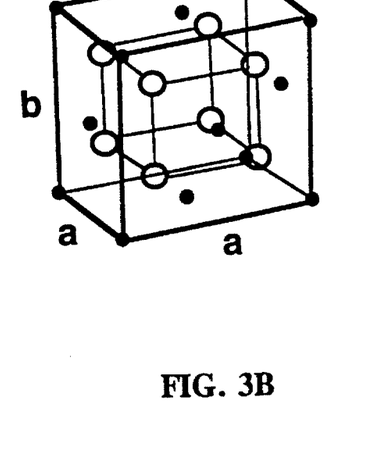

The invention can provide a tough coating that will adhere to an unheated substrate regardless of its chemical nature. The coating absorbs strain energy when stress (force) is applied in both static and cyclic loading, thereby protecting the underlying substrate surface against mechanical damage. Stress on the transformation-toughening ceramics used in the coating triggers a martensitic transition in the zirconia layer from the tetragonal crystal polymorph depicted in FIG. 3B (t-$ZrO_2$), a metastable polymorph at standard temperature and pressure (STP), to the more stable monoclinic crystal polymorph depicted in FIG. 3A (m-$ZrO_2$), the equilibrium STP phase.

According to one aspect of the invention, layers 12, 13 are sequentially deposited on a substrate 11 with no possibility for gross interlayer interaction. Such unwanted interactions are due to the high temperatures employed to obtain a tetragonal phase in the composite. For known bulk zirconia composites, the formation temperature must generally exceed 1020° C. By contrast, the process of the invention can be carried at temperature well under 1000° C.

As discussed hereafter, four aspects of the formation process contribute to the superior properties of the resulting coating. These are (1) the laminate structure of the coating (as compared to a composite wherein the different ceramics are mixed together); (2) limiting the thickness the layers, particularly the zirconia layer, to a nanometer scale to control crystal structure by controlling zirconia crystallite diameter; (3) using pure zirconia rather than an alloy of zirconia that contains an additive, such as yttria, to stabilize the tetragonal phase; and (4) using a near-room temperature, vapor deposition process to fabricate the nanolaminate.

The zirconia layers 12 are polycrystalline, i.e., are made up of a multitude of closely packed crystallites wherein the average maximum crystallite dimension is preferably less than 13 nm. "Metastable" refers to the ability of the tetragonal zirconia phase to remain stable until subject to a stress of sufficient magnitude to cause the transformation to the monoclinic form. Surprisingly, it has been found that tetragonal zirconia in layers 12 according to the invention remains stable over a wide temperature range of −165° C. to 700° C.

A nanolaminate structure is used to stabilize a mono- or bi-phasic structure in zirconia layers 12, which structure provides for the transformation-toughening behavior of the coating. In general, each zirconia layer 12 may contain a mixture of monoclinic and tetragonal zirconia phases. The zirconia layer toughens the coating by means of three mechanisms in response to an applied force: (1) the transformation of the tetragonal zirconia to monoclinic zirconia; (2) microcracking in both phases; and (3) twinning in the monoclinic zirconia phase.

Since t-$ZrO_2$ contributes to the toughness to a greater extend than m-$ZrO_2$, the zirconia layers 12 are preferably formed so that the tetragonal phase predominates. It has been found according to the invention that, in order to produce a significant amount of tetragonal phase constituent in the zirconia layer, the crystallite diameter should be less than about 13 nm. The zirconia layer thickness is therefore restricted to ensure the growth of the desired mono- or bi-phasic structure.

With a diffusion-limited growth model, several kinetic factors control crystallite size and determine the narrow range of process parameters over which t-$ZrO_2$ is formed. For the example shown in FIG. 4, the amount of the tetragonal phase drops to zero as the zirconia layer thickness reaches about 30 nm. However, this limit will vary depending on the deposition rate and temperature employed for deposition. In general, lowering the zirconia deposition temperature or increasing the deposition rate will increase this upper limit as illustrated by the sample estimated curve A in FIG. 4. Conversely, increasing the zirconia deposition temperature or lowering the deposition rate will decrease this upper limit as illustrated by the sample estimated curve B in FIG. 4.

Figure 4:
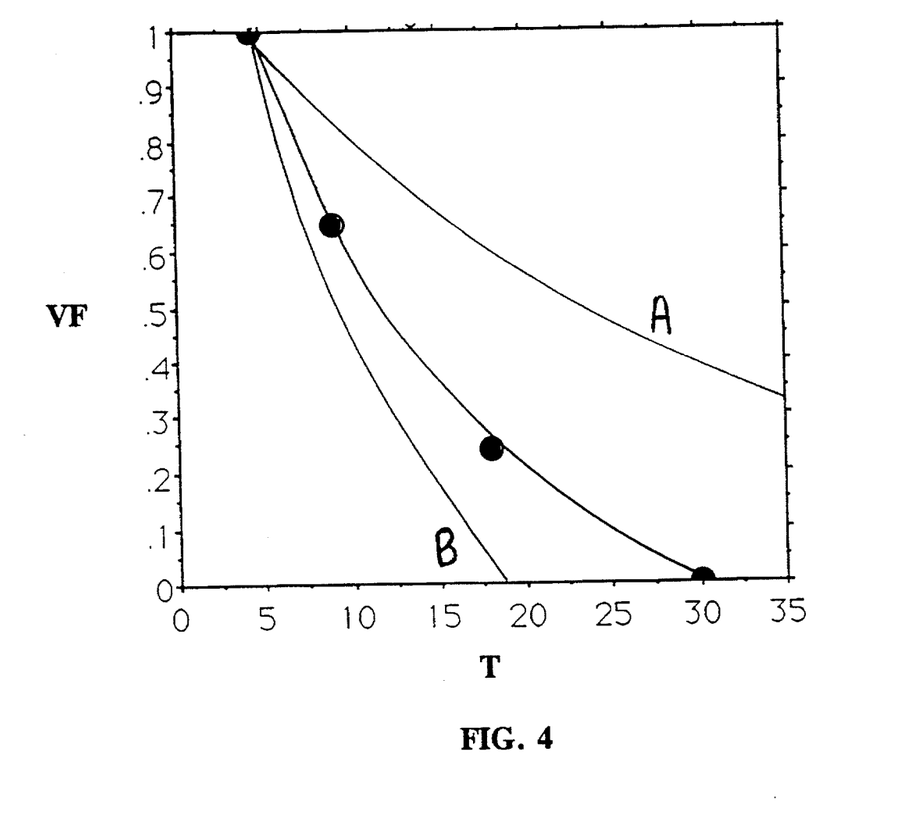
FIG. 4 is a graph of tetragonal zirconia volume fraction (VF) versus zirconia layer thickness (T) in nm.

However, as FIG. 4 further shows, the layer thickness limit at which pure t-$ZrO_2$ is formed is up to about 4 nm regardless of the deposition conditions. Thus, in accordance with one aspect of the invention, pure t-$ZrO_2$ films can be deposited under a variety of sputter deposition conditions as long as the thickness remains in the 3–4 nm range. Where the layer thickness exceeds 4 nm, the sputter deposition temperature and deposition rate can be controlled so that bi-phasic films are produced at much greater thicknesses, for example, from 4 to 1000 nm or more, while maintaining the t-$ZrO_2$ content greater than 50%, the balance being m-$ZrO_2$. In either case, 3 nm represents a lower limit in the sense that it is impractical and inefficient to make layers 12, 13 thinner than 3 nm.

When the maximum dimension of a tetragonal zirconia crystallite exceeds 6 nm, it converts to monoclinic form. Maintaining the layer thickness at 6 nm assures that such conversions will not take place, and thickness range of from about 3 up to 6 nm for the zirconia layer is therefore preferred for obtaining pure or substantially pure tetragonal zirconia. When the maximum dimension of the monoclinic zirconia crystallites reaches 13 nm, it has been found that the tetragonal zirconia phase disappears (drops to 0% by volume). Accordingly, the thickness range from more than 6 nm up to 13 nm guarantees that at least some t-$ZrO_2$ will be present regardless of the sputter deposition conditions.

Sputter deposition as described above can form layers of metastable tetragonal zirconia without need for a stabilizing dopant. Such a dopant increases the brittleness of t-$ZrO_2$ and tends to prevent the transformation back to the monoclinic phase, thus reducing the stress-absorbing properties of the laminate. Other film forming methods will not necessarily form tetragonal zirconia. Electron beam evaporation, for example, forms amorphous zirconia which does not have the advantageous properties of tetragonal zirconia as described herein.

The hard ceramic layer 13 is preferably amorphous in structure and acts as an elastic constraint on each adjacent zirconia layer 12, thereby holding the coating together even upon application of high impact forces. The tetragonal-to-monoclinic zirconia transition involves an anisotropic volume expansion of about 4%. Polycrystalline zirconia has a lower elastic modulus than amorphous alumina and undergoes a phase transformation as noted above that causes it to toughen when a force is applied in any direction with respect to the coating plane. Amorphous alumina has twice the elastic modulus of polycrystalline zirconia (390 vs 207 GPa) and is an effective elastic constraint, providing structural stability to the transformed composite as it retains its phase and shape integrity even when subject to a high external force. Layers 13 also provide a restart surface for zirconia growth, and act as growth terminators for zirconia crystallites during film deposition as mentioned above.

Sputter deposition at temperatures below 1000° C. in accordance with the invention assures that the hard ceramic (alumina) will be amorphous so that the interfaces between zirconia and alumina layers are incoherent with respect to crystal structure. This is important because damage (cracking) should not be transmitted along easy crystallographic paths from one layer to another.

The hard ceramic layers 13 should be sufficiently thin so that strain is transmitted between two successive zirconia layers 12 without fracturing the adjoining layer 13. This situation is analogous to crack-bridging in macroscopic, frictionally-bonded ceramic fibre composites consisting of brittle ceramic fibers in a more ductile ceramic matrix, for example, SiC fibers in glass. In this system, a crack grows in the ductile component leaving the brittle fibers intact up to a certain peak load at which the fibers sequentially decohere from the matrix, thereby avoiding catastrophic failure. Layers 13 thus have a thickness in the range of 3 nm up to about 1 micron. However, to obtain optimum coating properties, it is most preferred that layers 13 have substantially the same thickness as layers 12, and for that purpose the thickness of layers 13 should be in the range of 3 to 1000 nm, especially 3–13, or 3–6 nm for substantially pure tetragonal zirconia.

High hardness is an inherent characteristic of ceramics such as $Al_2O_3$, SiC, BN and TiN. Zirconia has a Mohs hardness of 7, whereas the hard ceramic layer preferably has a Mohs hardness greater than 7, especially at least 9, to provide a coating which is highly scratch resistant. However, a slightly less hard ceramic such as silica ($SiO_2$, Mohs hardness=7) could be used if extremely high hardness is not required for a specific application.

Bulk zirconia-alumina composites are fabricated at high temperatures where t-$ZrO_2$ is stable. Retaining t-$ZrO_2$ at STP is usually accomplished by adding a dopant such as yttria and minimizing the grain size to suppress the transition to m-$ZrO_2$ upon cooling. By contrast, the present invention can provide a polycrystalline thin film coating wherein the critical coating fabrication step can form t-$ZrO_2$ at or near standard temperature and pressure.

In sputter-deposited biphasic m+t-$ZrO_2$ films grown at room temperature, a volume fraction of up to 50% t-$ZrO_2$ has been retained by crystallite size control alone. See C. K. Kwok and C. R. Aita, *J. Vac. Sci. Technol.* A 7, 1235 (1989), and A 8, 3345 (1990), *J. Appl. Phys.* 66, 2756 (1989), and *J. Amer. Ceram. Soc.* 73, 3209 (1990), and C. R. Aita, *J. Vac. Sci. Technol.* A 11, 1540 (1993). According to the invention, it has been discovered that zirconia films wherein the volume fraction of t-$ZrO_2$ is greater than 50% can be produced by controlling the sputter deposition parameters prescribed hereafter.

According to the method of the invention, a nanolaminate containing t-$ZrO_2$ layers is fabricated by reactive sputter deposition, which involves film growth in a low pressure glow discharge environment. A solid target is bombarded (sputtered) by energetic gas ions, and the ejected atoms and molecules are collected on a substrate to form a film. Reactive sputter deposition involves the introduction of a reactive gas, in this example oxygen, into the discharge. As a result, chemical reactions can occur at the target surface, in the gas phase, or at the substrate.

The sputter deposition method used to make the nanolaminates according to the invention is generally known and is not described in detail herein. However, as discussed above, it has been discovered that careful control of certain sputter deposition conditions and parameters can result in biphasic monoclinic and tetragonal zirconia films containing a majority of t-$ZrO_2$, as compared to the foregoing previously known films containing more than 50% of monoclinic zirconia. Substrate temperature, ZrO deposition rate and layer thickness are essential conditions for obtaining a mixed monoclinic-tetragonal zirconia layer with more than 50% t-$ZrO_2$ free of a stabilizing dopant. Of course, if the substrate is a plastic or other low-melting substance, the temperature must be maintained below the melting point of the substrate, e.g., at or near room temperature, by use of water or liquid nitrogen cooling.

The ZrO deposition rate determines the number of monolayers that form per second, which generally should be from 0.5 to 3.5 nm/min, preferably 1–3 nm/min. At 0.5–1 nm/min the deposition rate becomes too slow to be practical, whereas between 3.0–3.5 nm/min elemental zirconium starts to be deposited. A higher deposition rate is desirable because the each arriving monolayer has the effect of "freezing" the layer beneath it in place before it can revert to the inherently more stable monoclinic form.

Other sputter deposition parameters such as power level, operating frequency and the like are determined as needed with the foregoing objectives in mind and are not critical per se. Cathode voltage for both zirconia and alumina will generally be in the range of −1.0 to −1.9 kV. The voltage during zirconia film formation is kept low enough so that deposition of elemental zirconium is avoided, but high enough so that a reasonable deposition rate is obtained.

To grow zirconia-alumina nanolaminates according to the invention, sputter deposition is preferably performed in a multiple target rf diode system. The sputter gas is pure oxygen or a mixture of oxygen and an inert gas such as argon, neon or krypton, such that the oxygen content is anywhere from about 2 to 100% by volume. Diluting the gas composition with an inert gas is effective to raise the deposition rate of the oxide to a desired level. On the other hand, there must be sufficient oxygen present so that the target surface can remain completely oxidized.

Substantially pure oxygen is preferred for obtaining a high proportion of tetragonal zirconia. However, in an alternate embodiment, argon discharges containing 2–4% $O_2$ may be used to sequentially sputter Zr metal and [SiC]$_x$[Al$_2$O$_3$]$_{1-x}$ pressed powder targets. This discharge chemistry contains enough oxygen to form zirconia at the growth interface and not enough oxygen to oxidize SiC when the molecule is sputtered intact, as is the case when low discharge voltage is used. The resulting layer 13 contains both SiC and alumina as a composite.

The layers are formed in the thickness ranges discussed above in order to obtain a coating that provides a unique combination of hardness and toughness, so much so that it proved difficult to scratch the test films described in the example below with a diamond stylus. The number of alternating layers 12, 13 deposited depends on the desired coating thickness for the intended end use. For a protective coating which need not be completely transparent, there will preferably be at least two of each of the layers 12, 13. However, for applications such as coated windows which must be transparent, it may be desirable to use a single zirconia layer 12 sandwiched between a plastic or glass panel 11 and the hard ceramic layer 13.

Nanolaminates according to the invention are electrically non-conductive and can be used in a wide variety of applications in which protective, sputter-deposited films and coatings are conventionally used. The extreme hardness and impact resistance of the laminates of the invention are particularly well adapted for use as coatings on mirrors and windows of all kinds, particularly specialty items such as X-ray mirrors, electrochromic automotive mirrors, cellular telephone and wristwatch windows, encapsulation materials for microelectronics, and lenses and other optics. The extreme thinness of the deposited layers of the invention as compared to prior art laminates is a particular advantage for such uses.

The following example further illustrates the invention.

EXAMPLE

Unheated Si (111) wafers and vitreous fused silica substrates were placed on a rotary table and moved sequentially under 13 cm diameter Zr and Al targets. The targets were sputtered in an rf diode apparatus at 13.56 MHz using 10 mTorr $O_2$ discharges operated at −1.4 kV for Zr and −1.1 kV for Al. The following settings were employed: sputter deposition gas 100% oxygen, power 400 watts, and substrate temperature 291° C. The zirconia layer growth rate was approximately 1.5 nm/min and the alumina layer growth rate was approximately 0.5 nm/min. This yielded a sputtered flux rate (J) of $0.9 \times 10^{14}$/cm$^2$-s for zirconia, wherein 20 nm/min equals 1 layer per second or $10_{15}$ ZrO molecules/cm$^2$-s. The time to deposit the zirconia layers was 12 min for film A, 6 min for film B, and 3 min for films C, D and D'. The time to deposit the alumina layers was 7.4 minutes for each.

The alumina layer thickness was kept constant at approximately 3.7 nm. The substrate material, number of zirconia layers, zirconia layer thickness, and total thickness for each nanolaminate are given in Table 1:

TABLE 1

| Film | Number of ZrO$_2$ layers | ZrO$_2$ layer thickness [nm] | Total film thickness [nm] |
| --- | --- | --- | --- |
| A-silica | 9 | 18.0 | 160 |
| B-silica | 13 | 9.0 | 140 |
| C-silica | 17 | 4.5 | 190 |
| D-silica | 50 | 4.5 | 410 |
| D'-Si(111) | 50 | 4.5 | 410 |

X-ray and electron diffraction techniques were used for crystallographic analysis. Films on fused silica were analyzed by double angle x-ray diffraction (XRD) using unresolved Cu Kα x-radiation (λ=0.152 nm). Peak position (2Θ) maximum intensity (I), and full width of the peak at half of the maximum intensity (FWHM) were measured. The average crystallite dimension (D) perpendicular to the substrate plane was calculated using the Scherrer relation D=0.94λ/BcosΘ, where B is the FWHM after correction for instrument broadening contributions, as described in L. V. Azaroff, *Elements of X-ray Crystallography* (McGraw-Hill, New York, NY, 1968) pp. 551–2. The Scherrer equation gives the limiting case of broadening due to size effects with no contribution from random lattice strain, i.e., gives the minimum possible value of the average crystallite dimension. The volume fraction of each phase was calculated from the integrated intensities using the polymorph method as described in R. C. Garvie and P. S. Nicholson, *J. Amer. Ceram. Soc.* 55, 303 (1972).

High resolution electron microscopy (HREM) was performed in a JEM 4000EX transmission electron microscope with a point resolution of 0.17 nm for the 400 keV electrons used in this experiment. Cross-sections of the nanolaminate on Si (111) were prepared using standard sandwiching, cutting, grinding, dimpling and room-temperature Ar$^+$ ion milling procedures as described in J. C. Bravman and R. Sinclair, *J. Electron Micros. Tech.* 1, 53 (1984). Care was taken to avoid excessive forces and temperatures during specimen preparation to minimize the possible transformation of metastable t-ZrO$_2$. HREM images were digitized with an optical CCD camera. Lattice spacing measurements were performed using Digital Micrograph image acquisition and processing software by Gatan.

Figure 5:
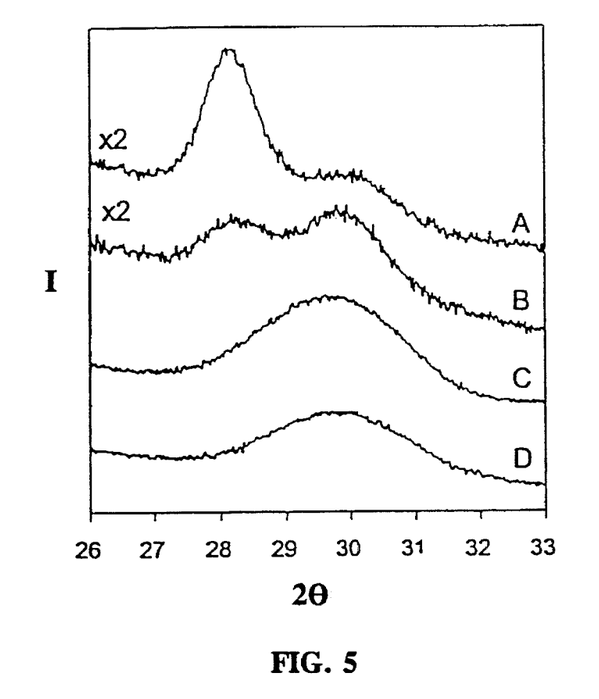
FIG. 5 is a graph of intensity (I) versus X-ray diffraction angle (2Θ) for four sample zirconia-alumina nanolaminates A, B, C and D according to the invention.

The major XRD peaks from films A and B are shown in FIG. 5 for all nanolaminates grown on fused silica. These peaks are attributed to diffraction from the (11$\bar{1}$) planes of m-ZrO$_2$ (2Θ=28.2° in an unstressed bulk material at room temperature) and the (111) planes of t-ZrO$_2$ (2Θ=30.3° in bulk material at 1020° C., the temperature at which reliable data is available; see *ASTM Joint Committee on Powder Diffraction Standards* 5, 1974, File Nos. 13–307 and 17–923.) For each phase, these orientations represent growth of the closest-packed planes parallel to the substrate. This has been shown to be the lowest free energy growth form of a crystallite on an amorphous substrate. See Bauer, *Single Crystal Films*, edited by M. H. Francombe and H. Sato, Macmillan, New York, NY, 1964, pp. 43–67. Very faint, broad peaks in the 2Θ=58°–63° range were observed and attributed to combined higher order diffraction from m- and t-ZrO$_2$ planes.

The patterns of films C and D consisted of a single broad peak. This peak was associated with diffraction from (111) t-ZrO$_2$ planes, but the broadness may have masked diffraction from a small number of (11$\bar{1}$) m-ZrO$_2$ planes as well. HREM was therefore used in order to resolve the ambiguity presented by the single broad XRD peak typical of films with small zirconia layer thickness such as films C, D, and D'.

A detailed analysis of lattice spacings of individual crystallites was carried out using digitized HREM images. Single crystallite regions of these images were selected and Fourier transformed. The spatial frequencies were measured using the Hanning window method, giving typical accuracies between 0.3% and 1% for the selected crystallites with image pixel size between 64 px and 128 px. See W. J. deRuijter et al. Scanning Microscopy, 6, (1993), 347–359. The (111) Si lattice fringes were used for calibration.

A digitized image was prepared of an area of the zirconia-alumina bilayer adjacent to the Si substrate in film D'. The Si substrate was oriented with the (110) zone parallel to the electron beam, resulting in edge-on orientation of the multilayer. Alumina and the native silicon oxide on the substrate (designated $SiO_x$) displayed random contrast typical of amorphous structures. Lattice fringes could clearly be seen in the zirconia layer.

A limited section of the zirconia layer was used to prepare a numerical diffractogram. The zirconia phase composition of the section examined by HREM was not obvious from the image. However, the diffractogram clearly showed that the region was biphasic. The lattice spacings obtained from the diffractogram indicated that the top part of the observed area was tetragonal while the bottom part was monoclinic. The monoclinic area had a twinned structure observed in most $m\text{-}ZrO_2$ crystallites in this nanolaminate. A comparison of the diffractogram and the digitized image revealed that the (111) $t\text{-}ZrO_2$ and (111) $m\text{-}ZrO_2$ planes were vicinally parallel to the substrate plane and continuous across the tetragonal-monoclinic interface. The diffractogram is indexed in Table 2:

TABLE 2

| $d_{hkl}$ of film [nm] | Plane | $d_{hkl}$ of bulk standard [nm] |
| --- | --- | --- |
| 0.3097 | m (11$\bar{1}$) | 0.3165 |
| 0.2960 | t {111} | 0.296 |
| 0.2947 | t {111} | 0.296 |
| 0.2539 | m(200), t(200), t(020) | 0.254 |

Comparison with bulk standards shows that the interplanar spacing of the twinned monoclinic region is approximately 2% smaller. In bulk materials, such behavior is typical of semicoherent interfacial regions between transformed monoclinic grains and the adjacent untransformed $t\text{-}ZrO_2$ parent phase. The combination of twinning and difference in $d_m(11\bar{1})$ from the bulk standard suggests that a tetragonal-to-monoclinic phase transformation occurred at some point in the film's history.

Figure 6:
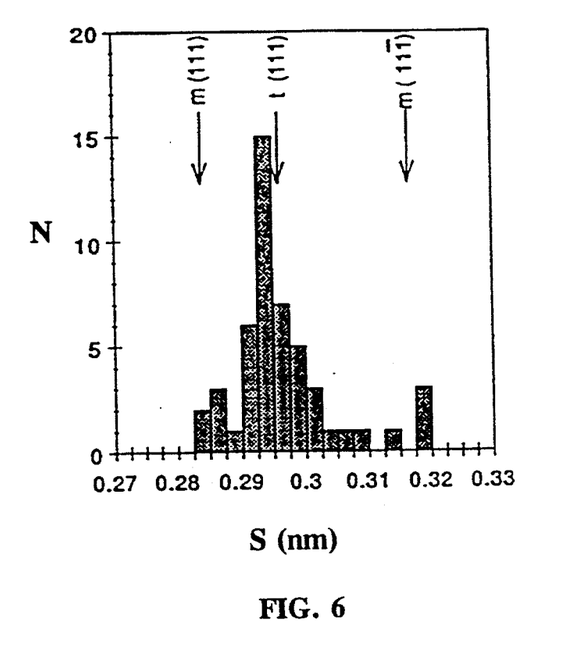
FIG. 6 is a histogram of number (N) of zirconia crystallites versus interplanar spacing (S) in nanometers for a $ZrO_2$ lattice according to the invention.

The interplanar spacings of the fifty zirconia crystallites are illustrated in the histogram of FIG. 6. The arrows in the histogram denote the values of d for bulk material. The interplanar spacing for the majority of (111) $t\text{-}ZrO_2$ crystallites is slightly smaller than the bulk value. This difference could have arisen because the bulk standard measurement was made at 1020° C., whereas the measurements for this example were made at room temperature.

HREM data was used to estimate the volume fraction of the two zirconia phases in film D'. The data show that film D' contained a volume fraction of 0.72±0.06 $t\text{-}ZrO_2$, the remainder being $m\text{-}ZrO_2$, although it is not clear whether this latter phase is present during growth or is a product of post-deposition transformation. In either case, FIG. 6 confirms that a large volume fraction of tetragonal zirconia is stabilized in the nanolaminate structure.

The above-discussed XRD and HREM data show that zirconia crystallites in the nanolaminates have either a (111) $t\text{-}ZrO_2$ and (11$\bar{1}$) $m\text{-}ZrO_2$ texture. These preferred orientations represent growth with closest-packed planes of the respective phases oriented parallel to the substrate plane. This is consistent with the general principle that when the adsorbate-substrate interaction is weak compared to the interaction among adsorbed species, film growth with closest-packed lattice planes parallel to the substrate is the low energy configuration. The volume fraction of $t\text{-}ZrO_2$ in each nanolaminate is given in Table 3:

TABLE 3

| Film | $t\text{-}ZrO_2$ VF* |
| --- | --- |
| A | 0.24 |
| B | 0.60 |
| C | ~1** |
| D | ~1** |
| D' | 0.72 +/− 0.06 |

*Remaining volume fraction (VF) was $m\text{-}ZrO_2$.
**Analysis assumes peak is entirely due to $t\text{-}ZrO_2$.

The $t\text{-}ZrO_2$ volume fraction increases with decreasing zirconia layer thickness. As discussed above, all of the nanolaminates have a $t\text{-}ZrO_2$ component. The two-phase nature of the zirconia layers is a consequence of the fineness of their structure. Under the conditions employed in this example, nanolaminates with thicker (25–30 nm) zirconia layers were almost entirely $m\text{-}ZrO_2$.

The foregoing example shows that nanolaminate geometry can be effectively used to control the phase composition of zirconia in thin film coatings. The volume fraction of tetragonal zirconia, the desired phase for transformation-toughening behavior, increases with decreasing zirconia layer thickness. Nanolaminates with a volume fraction of tetragonal zirconia exceeding 0.6 or even 0.8 can be produced without the addition of a stabilizing dopant, and independently of the kinetic factors that limit tetragonal zirconia growth in pure zirconia.

The thermal stability of these coatings is also important. Thermal cycling data (up to 16 hours) showed excellent phase stability of nanolaminate coatings on fused silica, over a temperature range from liquid nitrogen to approximately 700° C. Optical examination and X-ray diffraction measurements showed that no change to the monoclinic phase occurred within this temperature range.

It will be understood that the foregoing description is of preferred exemplary embodiments of the invention, and that the invention is not limited to the specific forms shown. Modifications may be made in without departing from the scope of the invention as expressed in the appended claims.

I claim:

1. A laminate product, comprising:

a support;

a thin layer consisting essentially of polycrystalline metastable tetragonal zirconia superposed on the support; and a thin layer of a hard ceramic other than zirconia formed directly on the zirconia layer.

2. The product of claim 1, wherein the zirconia layer has a maximum thickness of 6 nm.

3. The product of claim 1, wherein the zirconia layer consists of mixed metastable tetragonal and monoclinic phases.

4. The product of claim 2, wherein the zirconia layer consists of a metastable tetragonal phase substantially free of a monoclinic phase.

5. The product of claim 1, wherein the hard ceramic layer consists essentially of a ceramic selected from the group consisting of oxides, nitrides, and carbides, and mixtures thereof, and has a thickness in the range of 3 nm to about 1 micron.

6. The product of claim 5, wherein the hard ceramic layer consists essentially of alumina.

7. The product of claim 1, further comprising at least two of the zirconia layers and at least two of the hard ceramic layers alternating with each other.

8. The product of claim 1, wherein the support is a transparent material, and the zirconia layer and hard ceramic layer are transparent.

9. The product of claim 1, wherein the zirconia layer is essentially pure and is free of dopants.

10. The product of claim 1, further comprising a thin electrically conductive layer superposed on the zirconia layer and the hard ceramic layer.

11. The product of claim 10, wherein the conductive layer is coextensive with the zirconia and hard ceramic layers.

12. The product of claim 10, wherein the conductive layer consists essentially of indium-tin oxide.

13. The product of claim 10, wherein the support is a transparent material, and the zirconia layer, hard ceramic layer and conductive layer are transparent.

14. A laminate product, comprising:

a support;

a layer consisting essentially of polycrystalline metastable tetragonal zirconia having a maximum thickness of 6 nm superposed on the support, wherein the metastable tetragonal zirconia is capable of undergoing a transition to a monoclinic zirconia phase upon application of stress to the zirconia layer; and a layer consisting essentially of a hard ceramic selected from the group consisting of oxides, nitrides, and carbides, and mixtures thereof, and having a thickness in the range of 3 nm to about 1 micron formed directly on the zirconia layer.

15. The product of claim 14, further comprising at least two of the zirconia layers and at least two of the hard ceramic layers alternating with each other.

16. The product of claim 14, wherein the product has been formed by depositing zirconia on the support by vacuum sputter deposition under conditions effective to form a thin layer consisting essentially of polycrystalline, metastable tetragonal zirconia on the support, and then depositing a hard ceramic by vacuum sputter deposition under conditions effective to form a thin layer of the hard ceramic on the zirconia layer.

* * * * *

UNITED STATES PATENT AND TRADEMARK OFFICE
CERTIFICATE OF CORRECTION

PATENT NO. : 5,472,795
DATED : 12/05/95
INVENTOR(S) : Carolyn R. Aita

It is certified that error appears in the above-indentified patent and that said Letters Patent is hereby corrected as shown below:

On the cover page, in the header, replace "Atita" with --Aita-- for the inventor.

On the cover page, in the title, replace "ZIROCONIA" with --ZIRCONIA--.

On the cover page, in the first column, replace "Carolyn R. Atita" with --Carolyn R. Aita-- for the inventor.

At column 1, line 53, replace "(SIC)" with --(SiC)--.

At column 7, line 52, replace "$10_{15}$" with --$10^{15}$--.

At column 9, line 27, replace "(111)" with "(11$\bar{1}$)".

Signed and Sealed this

Second Day of July, 1996

Attest:

BRUCE LEHMAN

*Attesting Officer*     Commissioner of Patents and Trademarks